US010334162B2

United States Patent
Seo et al.

(10) Patent No.: US 10,334,162 B2
(45) Date of Patent: Jun. 25, 2019

(54) VIDEO PROCESSING APPARATUS FOR GENERATING PANORAMIC VIDEO AND METHOD THEREOF

(71) Applicant: SAMSUNG ELECTRONICS CO., LTD., Suwon-si (KR)

(72) Inventors: Ju-hee Seo, Hwaseong-si (KR); Chang-yeong Kim, Seoul (KR); Seung-jin Baek, Seoul (KR); Yong-seok Heo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 14/804,687

(22) Filed: Jul. 21, 2015

(65) Prior Publication Data

US 2016/0050368 A1 Feb. 18, 2016

(30) Foreign Application Priority Data

Aug. 18, 2014 (KR) .................. 10-2014-0106795

(51) Int. Cl.
*H04N 5/00* (2011.01)
*H04N 5/232* (2006.01)
(Continued)

(52) U.S. Cl.
CPC ....... *H04N 5/23238* (2013.01); *G06T 3/4038* (2013.01); *G06T 7/11* (2017.01);
(Continued)

(58) Field of Classification Search
CPC ... G06K 9/46; G06K 9/00; G06K 9/34; A63F 13/00; A63F 13/52; A63F 2300/1093;
(Continued)

(56) References Cited

U.S. PATENT DOCUMENTS 7,884,977 B2 * 2/2011 Mori .................. H03M 7/30
358/505
8,086,044 B2 * 12/2011 Feng .................. H04N 1/41
382/220
(Continued)

FOREIGN PATENT DOCUMENTS

| CN | 101867720 A | 10/2010 |
|---|---|---|
| CN | 102201115 A | 9/2011 |

(Continued)

OTHER PUBLICATIONS

Communication dated Apr. 30, 2018 by the Korean Intellectual Patent Office in counterpart Korean Patent Application No. 10-2014-0106795.
(Continued)

*Primary Examiner* — Frank F Huang
(74) *Attorney, Agent, or Firm* — Sughrue Mion, PLLC

(57) ABSTRACT

A video processing apparatus is provided. The video processing apparatus includes: a storage configured to store a video captured by a camera; and a controller configured to separate a target object from a background image in each of a plurality of key frames contained in the video, stitch separated background images to generate a panoramic background image, synthesize the target object with the panoramic background image to acquire a plurality of panoramic images corresponding to the plurality of key frames, and combine the panoramic images in a time axis to generate a panoramic video.

19 Claims, 14 Drawing Sheets

(51) Int. Cl.
*H04N 5/272* (2006.01)
*H04N 5/14* (2006.01)
*G06T 7/11* (2017.01)
*G06T 7/174* (2017.01)
*G06T 7/194* (2017.01)
*G06T 3/40* (2006.01)

(52) U.S. Cl.
CPC .............. *G06T 7/174* (2017.01); *G06T 7/194* (2017.01); *H04N 5/144* (2013.01); *H04N 5/23261* (2013.01); *H04N 5/23293* (2013.01); *H04N 5/272* (2013.01); *G06T 2207/10016* (2013.01)

(58) Field of Classification Search
CPC .. H04N 5/2226; H04N 5/23206; H04N 19/46; H04N 5/272; H04N 19/17; H04N 21/234; H04N 19/162
See application file for complete search history.

(56) References Cited

U.S. PATENT DOCUMENTS

| | | | |
|---|---|---|---|
| 8,368,720 B2 | 2/2013 | Peterson | |
| 2007/0030396 A1 | 2/2007 | Zhou et al. | |
| 2008/0143820 A1* | 6/2008 | Peterson | G06T 3/4038 |
| | | | 348/36 |
| 2008/0212942 A1* | 9/2008 | Gordon | H04N 21/8545 |
| | | | 386/282 |
| 2010/0134641 A1 | 6/2010 | Marti et al. | |
| 2010/0265313 A1 | 10/2010 | Liu et al. | |
| 2011/0234750 A1* | 9/2011 | Lai | G03B 37/04 |
| | | | 348/37 |
| 2012/0249957 A1* | 10/2012 | Shibata | A61B 3/0025 |
| | | | 351/206 |
| 2012/0250980 A1* | 10/2012 | Gillard | H04N 5/2226 |
| | | | 382/154 |
| 2012/0254369 A1* | 10/2012 | Gillard | H04N 13/004 |
| | | | 709/219 |
| 2012/0257005 A1* | 10/2012 | Browne | G02B 27/017 |
| | | | 348/36 |
| 2013/0182066 A1* | 7/2013 | Ishimoto | H04N 7/181 |
| | | | 348/38 |
| 2013/0250045 A1 | 9/2013 | Ki et al. | |
| 2013/0329072 A1 | 12/2013 | Zhou et al. | |
| 2014/0037213 A1* | 2/2014 | Niederberger | G06T 11/00 |
| | | | 382/195 |
| 2016/0241892 A1* | 8/2016 | Cole | H04N 19/597 |

FOREIGN PATENT DOCUMENTS

| | | |
|---|---|---|
| JP | 2011-40920 A | 2/2011 |
| KR | 10-2010-0120187 A | 11/2010 |
| KR | 10-2011-0124448 A | 11/2011 |
| KR | 10-2013-0107840 A | 10/2013 |
| WO | 2009/099893 A1 | 8/2009 |

OTHER PUBLICATIONS

Office Action dated Dec. 24, 2018 by the State Intellectual Property Office of P.R. China in counterpart Chinese Patent Application No. 201510508376.8.

* cited by examiner

GENERATE PANORAMIC IMAGE THROUGH OVERLAY

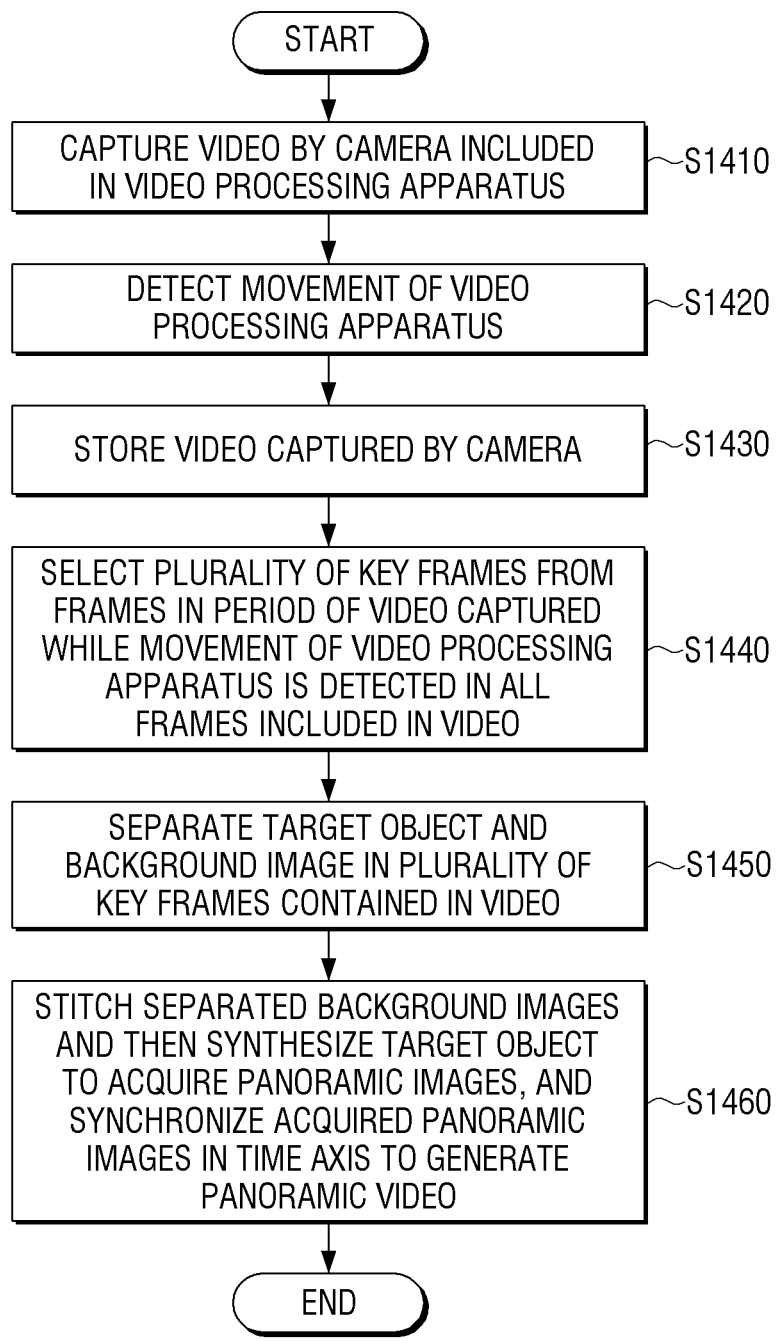

VIDEO PROCESSING APPARATUS FOR GENERATING PANORAMIC VIDEO AND METHOD THEREOF

CROSS-REFERENCE TO RELATED APPLICATION

This application claims priority from Korean Patent Application No. 10-2014-0106795, filed on Aug. 18, 2014, in the Korean Intellectual Property Office, the disclosure of which is incorporated herein by reference in its entirety.

BACKGROUND

1. Field

Apparatuses and methods consistent with the exemplary embodiments relate to video processing, and more particularly, to a video processing to generate a panoramic video.

2. Description of the Related Art

Recently, as the definition and resolution of an image displayed by a digital image apparatus are improved, a panoramic video has received attention as an attempt to provide viewers with more image information in one image. This attention is related to transition from a conventional 4:3 screen to a 16:9 screen for image display, and further, visual needs for acquisition of reality images through a panoramic video.

For example, the panoramic video is appropriate to express figures of soccer players in a stadium. With regard to conventional sports broadcasting, when an entire stadium is displayed as one image, figures of soccer players are displayed to be relatively small and the image also inevitably contains figures other than the stadium due to the shape of the stadium that is long in a horizontal direction, and thus, only a part of the stadium instead of the entire stadium is displayed to viewers. However, when a panoramic video is used in sports broadcasting, the entire stadium may be displayed to the viewers at one time.

The panoramic video includes a plurality of consecutive panoramic images. In a related art, in order to acquire a panoramic video, the panoramic video is generated by connecting partial images of a stadium photographed by a plurality of cameras. Accordingly, if photographing by a plurality of cameras is performed not under required conditions (e.g., a required direction, exposure, etc.), it is difficult to generate a panoramic video after the photographing.

Accordingly, there is a need for a method for more conveniently and effectively generating a panoramic video.

SUMMARY

Exemplary embodiments may overcome the above disadvantages and other disadvantages not described above. Also, the exemplary embodiments are not required to overcome the disadvantages described above, and may not overcome any of the problems described above.

The exemplary embodiments provide a video processing apparatus and a method thereof, for generating a panoramic video using a plurality of key frames contained in a video.

According to an aspect of an exemplary embodiment, there is provided a video processing apparatus which may include: a storage configured to store a video captured by a camera; and a controller configured to separate a target object from a background image in each of a plurality of key frames contained in the video, stitch separated background images to generate a panoramic background image, synthesize the target object with the panoramic background image to acquire a plurality of panoramic images corresponding to the plurality of key frames, and combine the panoramic images in a time axis to generate a panoramic video.

The controller may select the key frames from frames of a panning section of the video which are captured while the camera is panned.

The video processing apparatus may further include the camera configured to capture the video; and a movement detection sensor configured to detect movement of the camera, wherein the controller determines a video section, corresponding to panning movement of the camera detected by the movement detection sensor, as the panning section.

The controller may analyze a property of an object contained in each frame included in the video, and select a plurality of frames having overlapping background images as the key frames.

The video processing apparatus may further include a display configured to display the video, wherein the controller may control the display to display the panoramic images at timing of displaying of the plurality of key frames in the video when the video is reproduced.

The controller may generate the plurality of panoramic images in which at least one of a position and a shape of the target object is changed as many times as a number of the key frames in order to express movement of the target object, replace the key frames with the panoramic images, and store the panoramic images in the storage.

The controller may determine a maximum aspect ratio of the panoramic video based on extended display identification data (EDID) information about a display to reproduce the video, and generate the panoramic video to have the determined maximum aspect ratio.

The controller may adjust the key frames to align background images of the key frames, and generate the panoramic video using each of the adjusted key frames.

The controller may display an indicator indicating that the panoramic images are generated, on the display when the video is reproduced.

The controller may display the indicator to overlap with the video and change at least one of a size, a shape, a position and a color of the indicator according to a property of the panoramic video when the video is reproduced on the display.

According to an aspect of another exemplary embodiment, there is provided a method for generating a panoramic video which may include: storing a video captured by a camera; separating a target object and a background image from each of a plurality of key frames contained in the video; stitching separated background images to generate a panoramic background image; synthesizing the target object with the panoramic background image to acquire a plurality of panoramic images corresponding to the plurality of key frames; and combining the panoramic images in a time axis to generate a panoramic video.

The key frames may be selected from frames of a panning section of the video which are captured while the camera is panned.

The method may further include detecting movement of the camera, wherein the panning section is a video section corresponding to panning movement of the camera detected in the movement of the camera.

The method may further include analyzing a property of an object contained in each frame included in the video and selecting a plurality of frames having overlapping background images as the key frames.

The method may further include displaying the panoramic video comprising the panoramic images at timing of displaying of the key frames in the video when the video is reproduced.

The method may further include: generating the panoramic images in which at least one of a position and a shape of the target object is changed as many times as a number of the key frames in order to express movement of the target object; and replacing the key frames with the panoramic images and storing the panoramic images.

The method may further include determining a maximum aspect ratio of the panoramic video based on extended display identification data (EDID) information about a display to reproduce the video.

The generating the panoramic video may include adjusting the key frames to align background images of the key frames and generating the panoramic video using each of the adjusted key frames.

The displaying the panoramic video may include displaying an indicator indicating that the panoramic video is generated.

The displaying the panoramic video may include displaying the indicator to overlap with the video and changing at least one of a size, a shape, a position, and a color of the indicator according to property of the panoramic video when the video is reproduced.

According to various exemplary embodiments, even if a user does not perform capturing a video for acquisition of a panoramic video at the video capturing time, a panoramic video may be acquired using video data in the future, thereby improving user convenience.

Additional and/or other aspects and advantages of the inventive concept will be set forth in part in the description which follows and, in part, will be obvious from the description, or may be learned by practice of the exemplary embodiments.

BRIEF DESCRIPTION OF THE DRAWING FIGURES

The above and/or other aspects will be more apparent by describing certain exemplary embodiments with reference to the accompanying drawings, in which:

FIG. 14 is a flowchart for explanation of a method for generating a panoramic video, according to another exemplary embodiment.

DETAILED DESCRIPTION OF THE EXEMPLARY EMBODIMENTS

The exemplary embodiments will now be described in greater detail with reference to the accompanying drawings.

Figure 1:
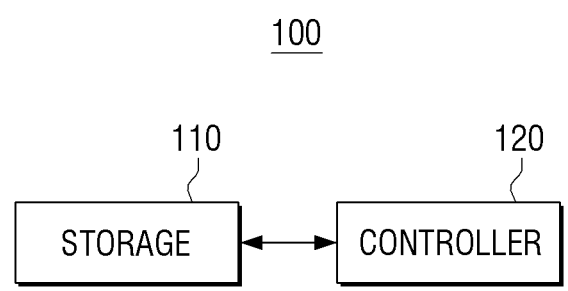
FIG. 1 is a schematic block diagram illustrating a configuration of a video processing apparatus, according to an exemplary embodiment.

FIG. 1 is a schematic block diagram illustrating a configuration of a video processing apparatus 100, according to an exemplary embodiment.

Referring to FIG. 1, the video processing apparatus 100 according to an exemplary embodiment includes a storage 110 and a controller 120.

The storage 110 stores a video captured by a camera. The video may be a video captured by one camera or a plurality of videos captured by a plurality of cameras at different angles. In addition, the storage 110 may function as a buffer for temporally storing image frames (hereinafter "frames") included in the video. In detail, the storage 110 may include a buffer for temporally storing image frames prior to generation of a panoramic video. In addition, the storage 110 may store various software modules and related information for processing the video to generate the panoramic video, and output this information about the various software modules and related information to the controller 120 as necessary.

The captured video may be stored in a system connected to a network as well as in the storage 110. In this case, a video may be remotely transmitted and copied using a communication unit (not shown).

The controller 120 controls an overall operation of the video processing apparatus 100.

In particular, the controller 120 may separate a target object and a background image in a plurality of key image frames (hereinafter "key frames") included in the video. The key frames may be detected from a series of frames in the video. The key frames may be detected by analyzing each frame. According to the analysis operation, a frame with a high variance is detected as a key frame from the video. For example, the key frame may be detected by analyzing camera movement, object movement, background movement, and so on from the video. In detail, the controller 120 may analyze a direction of camera movement, a direction and size of a variance of a motion vector, a direction of object tracking, and so on to detect the key frame.

In addition, the controller 120 may detect the key frame using frames per second (FPS) information about the video and detailed information about a camera. The detailed information about the camera refers to information about a position, a direction, an angle, and so on of a camera that photographs a video. The detailed information about the camera may be information included in the video.

The target object refers to a moving object separated from a background image in the key frame. That is, a moving object that a viewer watches with interest may be the target object. For example, when the viewer watches a video in which a vehicle passes a quiet country lane, the vehicle is the target object. A plurality of target objects may be present in a video. For example, with regard to sports broadcasting, the target objet may be soccer players and a ball. As described above, the key frames may be extracted to sufficiently express movement of the target object while reducing a burden for processing all frames.

Figure 2:
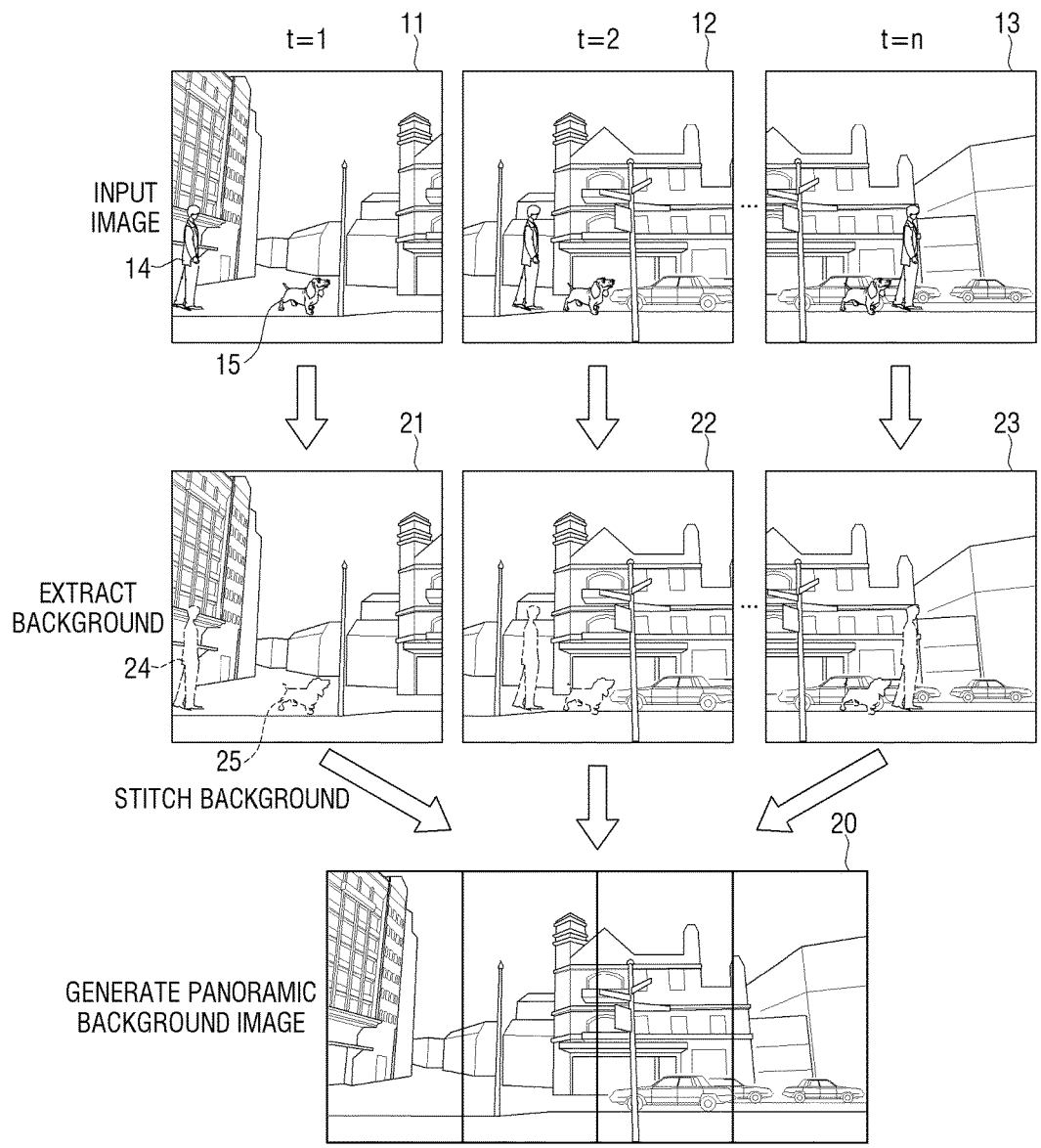
FIGS. 2 to 4 are diagrams for explanation of a process for processing a video to generate a panoramic video, according to exemplary embodiments.
Figure 3:
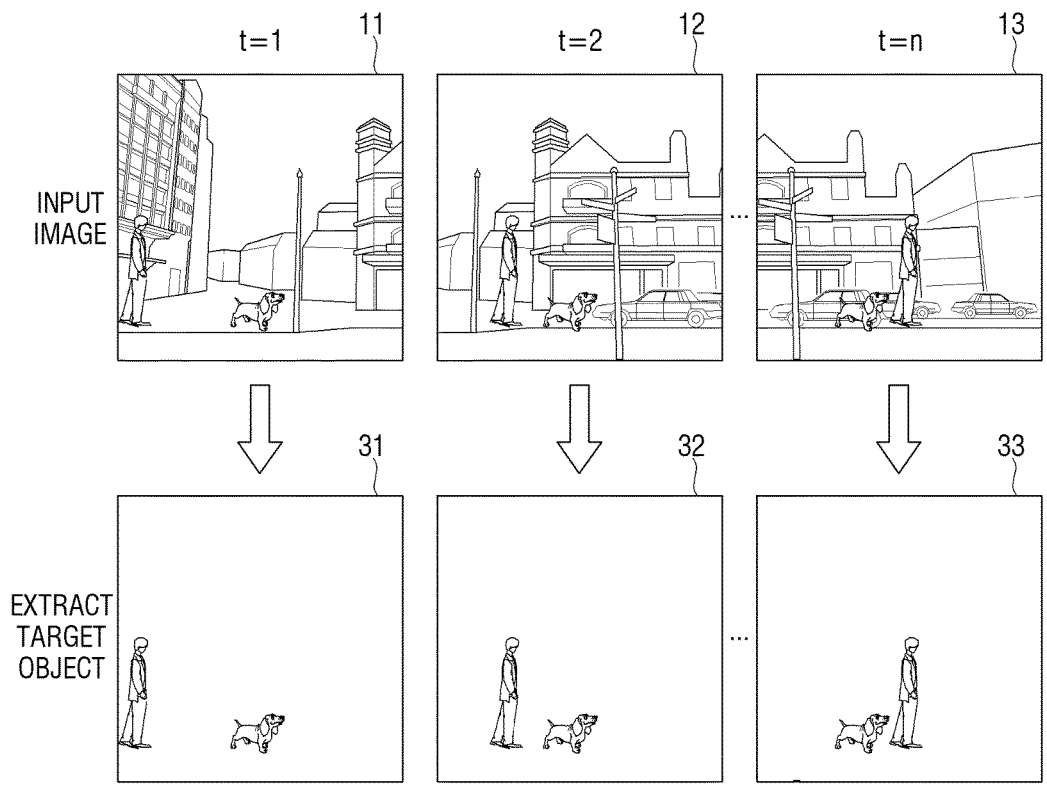
Figure 4:
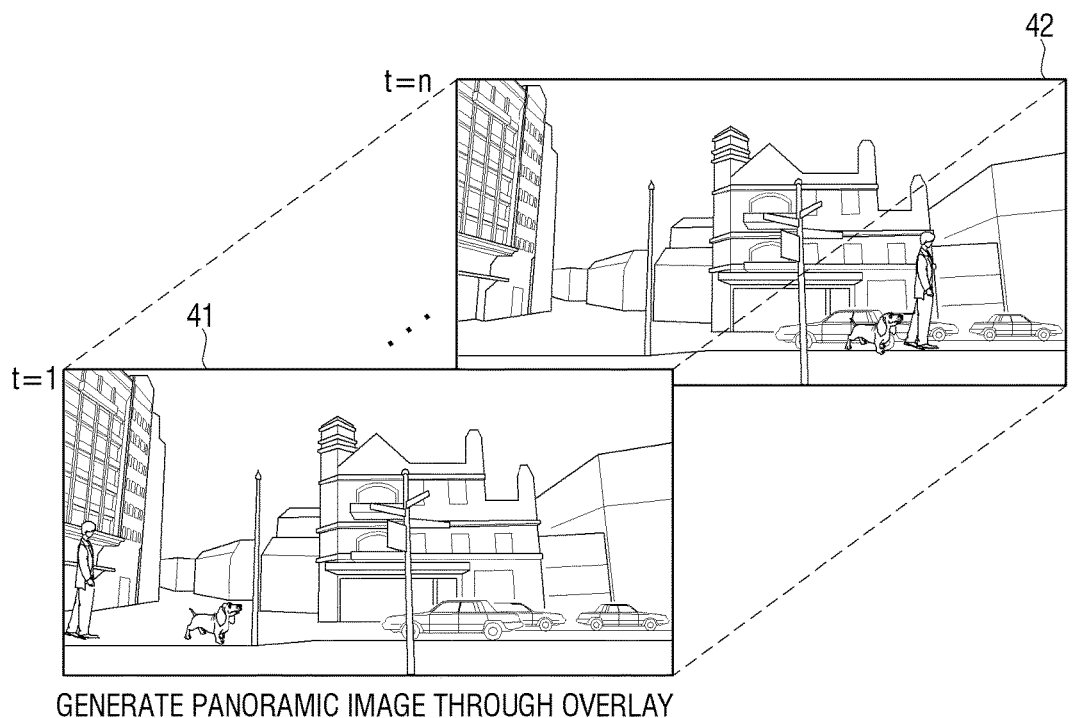

Hereinafter, FIGS. 2 to 4 are diagrams for explanation of a process for processing a video to generate a panoramic video, according to exemplary embodiments.

FIGS. 2 and 3 are diagrams for explanation of a process for stitching a background images separated from a frame to generate a panoramic image.

As shown in FIG. 2, a part of an input video (corresponding to a panoramic video generating time period) may include n frames. For convenience of description, FIG. 2 illustrates only a first frame 11, an intermediate frame 12, and a last frame 13 among a plurality of key frames extracted from the n frames of the panoramic video generating period. The input video is a video generated by capturing images in which a person 14 and a puppy 15 pass a road. In this case, the person 14 and the puppy 15 correspond to the target objects. A direction of the target objects a left-to-right direction from a viewpoint of a camera capturing the video, and a background image moves in a right-to-left direction while the target objects move.

The controller 120 may detect moving objects from the input video to determine the person 14 and the puppy 15 as the target objects. Here, the controller 120 may determine an object having a preset variance or more as a moving object. Then the controller 120 separates the target objects 14 and 15 from the background image in each key frame or each selected key frame. The target objects 14 and 15 may be separated from the background image using color and motion information. Accordingly, background images 21, 22 and 23 from which the target objects 14 and 15 are separated may be generated, and the controller 120 may connect the background images to generate one panoramic background image 20. In this case, in order to smoothly connect the background images, image processing methods such as general matching, image aligning, stitching, and blending may be applied. In particular, empty regions 24 and 25 generated in the background images 21, 22 and 23 from which the target objects 14 and 15 are separated may be filled using a hole filling image processing scheme. Thus, a panoramic background image that is long in a horizontal direction may be generated.

As shown in FIG. 3, target objects extracted from each key frame may be separated from a background image to generate new frames 31, 32 and 33. In this case, each of the generated new frames 31, 32 and 33 images of the extracted target objects without a background image.

FIG. 4 is a diagram for explanation of a method for synthesizing the extracted target objects and a generated panoramic background image to generate panoramic images to constitute a panorama video.

As shown in FIG. 4, a panoramic image may be generated by overlaying the target objects on the panoramic background image. In this case, a matting technology for a smooth synthesis may be applied. Thus, panoramic images 41 and 42 corresponding to t=1 and t=n, respectively, may be generated in which the target objects 14 and 15 move from the left to the right without changing the background image.

The controller 120 may detect a panning period in which includes frames captured while a camera is panned to generate a video, and select a plurality of key frames from frames included in the panning section. Panning refers to photographing performed while changing a photographing direction along a straight line trajectory by rotating a photographer who holds photograph equipment, a body part of a photographer (e.g., an arm for holding photograph equipment), or photograph equipment around a fixed position. For example, a camera operation for displaying situations of opposite sides or a panoramic scene may be performed by moving a camera mount head or a camera in a right or left direction. A camera head may be horizontally or vertically moved using a camera mount head, and in this regard, in this specification, panning includes either of horizontal and vertical movements. For example, in the case of soccer broadcasting, a scene captured by a camera may change by slowly moving a direction of the camera from a half line of a stadium toward a goalpost. In this case, a frame section which includes frames captured while moving the camera is a panning section.

The panning section may be extracted using motion vector information of a video. The controller 120 analyzes movement in the video using the motion vector information. As a result obtained by analyzing the video movement using the motion vector information, when the video shows a movement to a predetermined direction in a predetermined section of the video, the controller 120 may extract a section showing the movement as the panning section.

In addition, the controller 120 may analyze movement of one or more feature points to extract a panning section. For example, the controller 120 may extract a feature point of frames and analyze movement directions of the feature point to extract the panning section. In this case, the controller 120 may divide an image into a plurality of blocks, extract a feature point contained in each of the divided blocks, and also extract a feature point from an entire image. In addition, the controller 120 may analyze movement of a frame using a difference value between the extracted feature point and one or more surrounding pixel.

When the above panning section extracting method is used, a panning section may be extracted from a video (e.g., animation, computer graphic, etc.) that is not captured by a camera. For example, in the case of animation including a background and objects, movement of a background of animation may be analyzed using motion vector information about animation or a feature point of animation frames may be extracted to extract the same panning section as photographing during camera panning. The panning section refers to a video section constituting a panoramic video by analyzing motion vector information or background movement as well as a section of photographing while panning the camera.

In response to the panning section being extracted, the controller 120 may select a plurality of key frames from frames included in the extracted panning section. In this case, the controller 120 may analyze a property of an object contained in each frame constituting a video and select a plurality of frames having a common target object or a common background image as key frames. That is, in order to stitch key frames, continuity between frames is required, and a common target object or a common background image may be a stitching criterion.

In addition, the controller 120 may generate a plurality of panoramic images in which at least one of a position and a shape of a target object is changed as many times as the number of key frames, and replace the key frames with a plurality of panoramic images. Alternatively, the controller 120 may generate a panoramic image for each of all frames containing a plurality of key frames and use the all frames to generate a plurality of panoramic images. For example, additional regions obtained from the panning section may be stitched with right and left regions or up and down regions, and then, all frames of a video may be replaced with a panoramic image. In this case, the panoramic video generating section may be an entire section of the video. A panoramic video obtained by replacing a plurality of key frames with panoramic images may be stored in a storage.

The controller 120 may determine a maximum aspect ratio of a panoramic video based on extended display identification data (EDID) information, and generate the panoramic video to have the determined maximum aspect ratio. The EDID information may be information for determination of an output signal according to a condition appropriate for a display apparatus, and may be stored in a non-volatile memory in the display apparatus. When the video processing apparatus 100 includes a display, the EDID information may be stored in an internal memory of the video processing apparatus 100. The EDID information defines data such as basic display parameters and properties. For example, when the video processing apparatus 100 is embodied as a personal computer (PC), if a PC is connected to a television (TV), the PC may detect EDID information about the TV to output an image signal appropriate for the TV according to a definition of a plug and play function. The controller 120 may acquire information about an aspect ratio of the display apparatus based on the EDID information stored in the memory of the display apparatus and determine a maximum aspect ratio of a panoramic video according to the information. For example, when an aspect ratio of the display apparatus is 16:9, a vertical width of a panoramic video is reduced, and on the other hand, a horizontal width may be relatively and further increased so as to display a region added to the panoramic video. The vertical width may be reduced and thus letter boxes may be generated at upper and lower portions of the panoramic video. That is, more parts of an additional region obtained by extracting the panning section may be displayed. An aspect ratio of the panoramic video may be changed according to setting of a range of the panning section and a selection range of a key frame. For example, a range of the panning section may be set with respect to a distance between opposite ends of a frame section photographed while panning a camera in a right or left direction. In this case, when the range of the panning section is set to be wide, the aspect ratio of the panoramic video may also be increased. In addition, the aspect ratio of the panoramic video may be changed according to the number of selected key frames or a background image thereof.

A plurality of display apparatuses may be directly synchronized with one another or may be synchronized with one another through a set top box and may display one image displayed by one display apparatus. When the video processing apparatus 100 is connected to a plurality of display apparatus, the controller 120 may also recognize the number and resolutions of display apparatuses through EDID information to determine a maximum aspect ratio of a panoramic image.

In addition, the controller 120 may adjust a plurality of key frames so as to align background images of the plurality of key frames. For example, since a camera for video capturing is not always moved right and left or up and down in a uniform manner, overlapping portions of adjacent frames may not accurately match with one another due to shake and rotation of the camera. Accordingly, the controller 120 may appropriately move or rotate the key frames to be matched to generate a panoramic image. For example, when frames to be matched are moved or rotated, the frames may be connected to maximize similarity between overlapping pieces of color information to generate a panoramic image.

Figure 5:
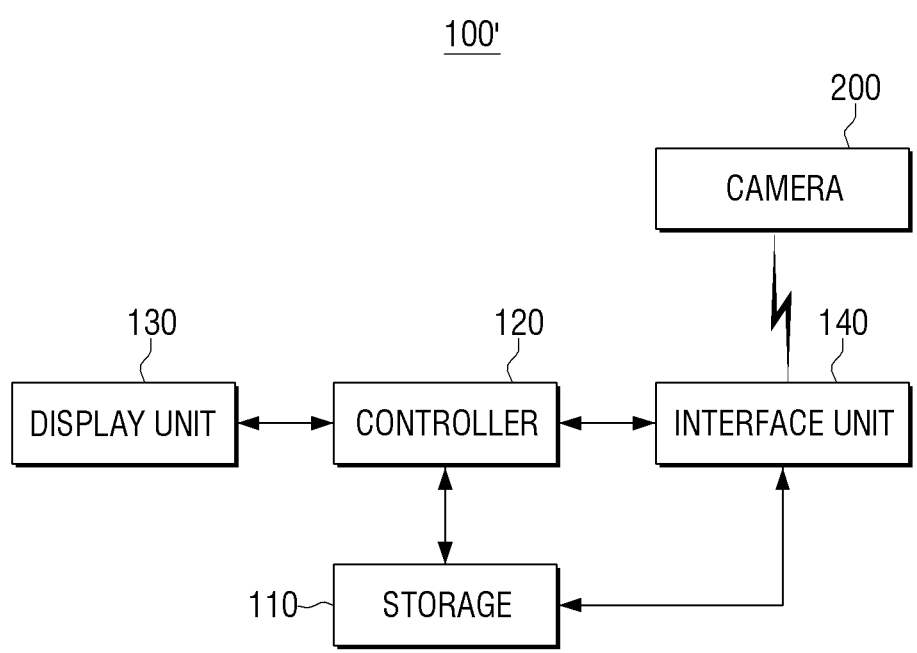
FIG. 5 is a schematic block diagram illustrating a configuration of a video processing apparatus, according to another exemplary embodiment.

FIG. 5 is a schematic block diagram illustrating a configuration of a video processing apparatus 100' according to another exemplary embodiment. As illustrated in FIG. 5, according to the present exemplary embodiment, the video processing apparatus 100' includes the storage 110, the controller 120, a display 130, and an interface 140. Hereinafter, repeated descriptions related to FIG. 1 will be omitted here.

The display 130 displays a panoramic video. In particular, when a video is reproduced, the display 130 may display the panoramic video at timing of displaying of a plurality of key frames in a video. In this case, an indicator for indicating that the panoramic video is generated may be displayed on the display. For example, when a video is reproduced, a panoramic video generating section during reproduction of the video may be distinctively indicated, and an indicator may be displayed to overlap with a portion of a panoramic image. In this case, the size, shape, position, and color of the indicator may be changed according to a property of the panoramic video. For example, when an aspect ratio of a panoramic video is 10:3, the indicator may be generated in the form of a rectangle of 10:3 and may be displayed to overlap with a portion of the video. Similarly, when an aspect ratio of a panoramic video is 21:9, the indicator may also have a rectangular shape with a ratio of 21:9.

The display 130 may be embodied as a liquid crystal display (LCD), an organic light emitting diodes (OLED), or the like, but is not limited thereto. In addition, the display 130 may be embodied as a flexible display, a transparent display, or the like, as necessary.

Accordingly, the video processing apparatus 100' may be embodied as various types of apparatuses with a display function, such as a digital TV, a PC, a navigation device, a kiosk, a digital information display (DID), and so on. When the video processing apparatus 100' is embodied as a digital TV, the video processing apparatus 100' may be controlled by a remote controller.

Figure 6:
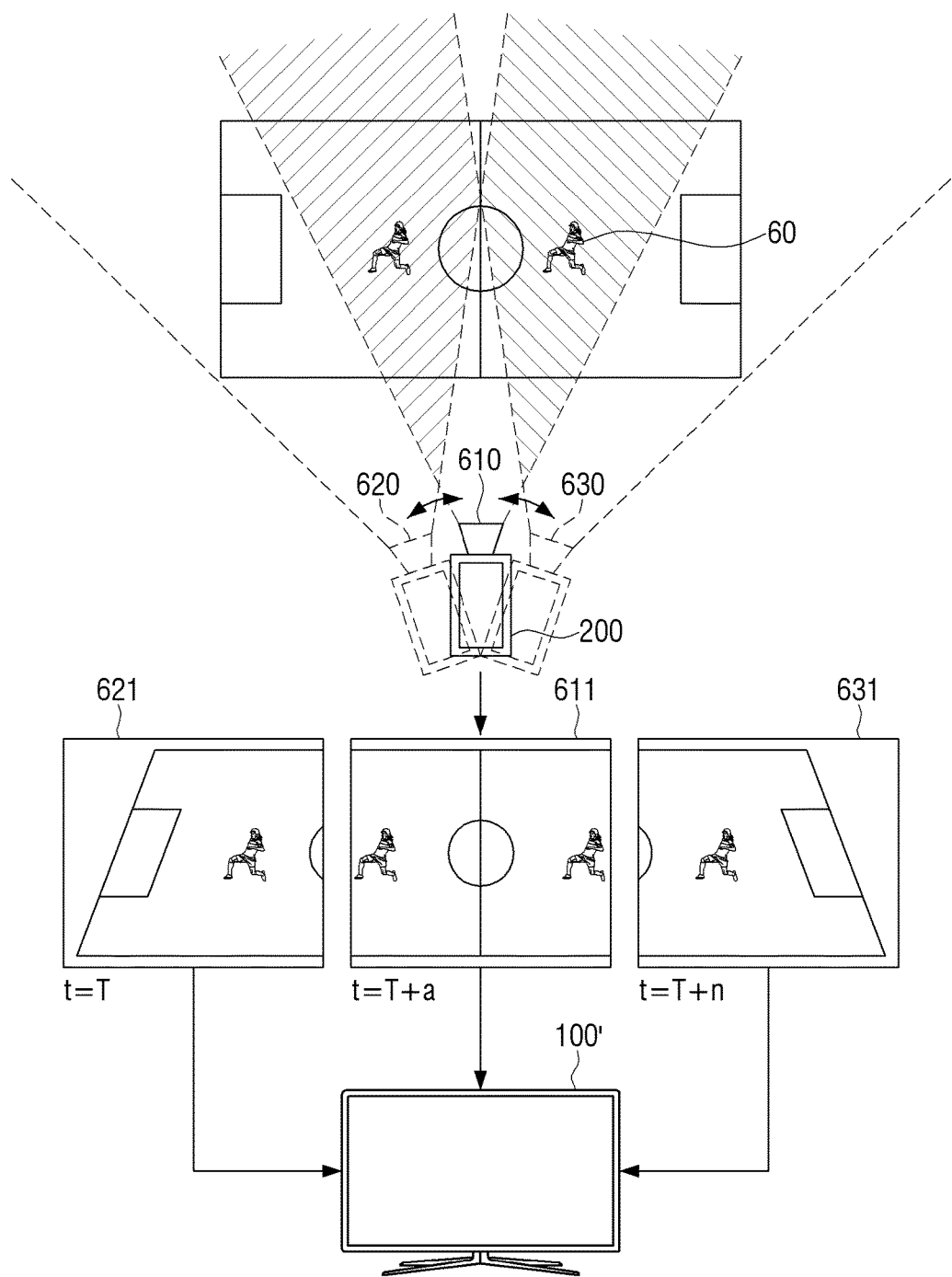
FIG. 6 is a diagram for explanation of a method for generating a panoramic video using a panning period, according to an exemplary embodiment.

Hereinafter, for convenience, FIGS. 5 and 6 illustrate the case in which the video processing apparatus 100' is embodied as a digital TV. However, the inventive concept is not limited thereto, and the video processing apparatus 100' may be embodied as various portable display apparatuses that are capable of processing an image, such as various types of portable media player, tablet PCs, and electronic dictionary in addition to a digital TV as a fixed apparatus.

The interface 140 is a component for receiving a video. Input images or a video may be captured by an external camera 200, and the video processing apparatus 100' may receive photographing information such as camera pose information of the external camera 200. The external camera 200 may be an imaging apparatus such as a digital camera and a cellular phone with photograph functions. According to an exemplary embodiment, a video captured by the external camera 200 may be received through the interface 140 to generate a panoramic video. Here, the camera 200 that captures a video may be a plurality of cameras and a video captured by a plurality of cameras may be a multi-view image. In this case, the controller 120 may further connect multi-view images according to a general method for generating a panoramic video. As such, the video processing apparatus 100 may process the video received through the interface 140 to generate a panoramic video.

FIG. 6 is a diagram for explanation of a method for generating a panoramic video using a panning section, according to an exemplary embodiment. As shown in FIG. 6, a TV 100' may receive images captured by a camera from a broadcaster through a tuner. In this case, the TV may simultaneously receive camera pose information, and so on. A storage included in the TV may store the received images to generate a panoramic video. When the images received from the broadcaster are images captured by the camera 100 (FIG. 5), a region shown in the images may change since these images are obtained by panning the camera 200. For example, when the received images are about a sports event such as a soccer game, it is assumed that the camera 200 photographs a stadium in a direction 610, and then, photographs a left goalpost to display the left goalpost by panning the camera 200 in a direction 620 or photographs a right goalpost to display the right goalpost by panning the camera 200 in a direction 630. In this case, when a plurality of key frames 611, 621 and 631 are selected from frames in a panning section, overlapping regions may be present in the key frames. Accordingly, frames obtained by separating images of a player or players as a target object or target objects from the key frames may be stitched to one another considering the overlapping region to generate a panoramic background image. In this case, the panoramic background image may be a background image containing both right and left goal posts. Then, the image(s) of the target object(s) are synthesized to acquire a panoramic image constituting a panoramic video. The acquired panoramic images are combined in the time axis to generate the panoramic video, and a panoramic video file prepared by compressing the panoramic video may be stored in a storage included in the TV.

Figure 7:
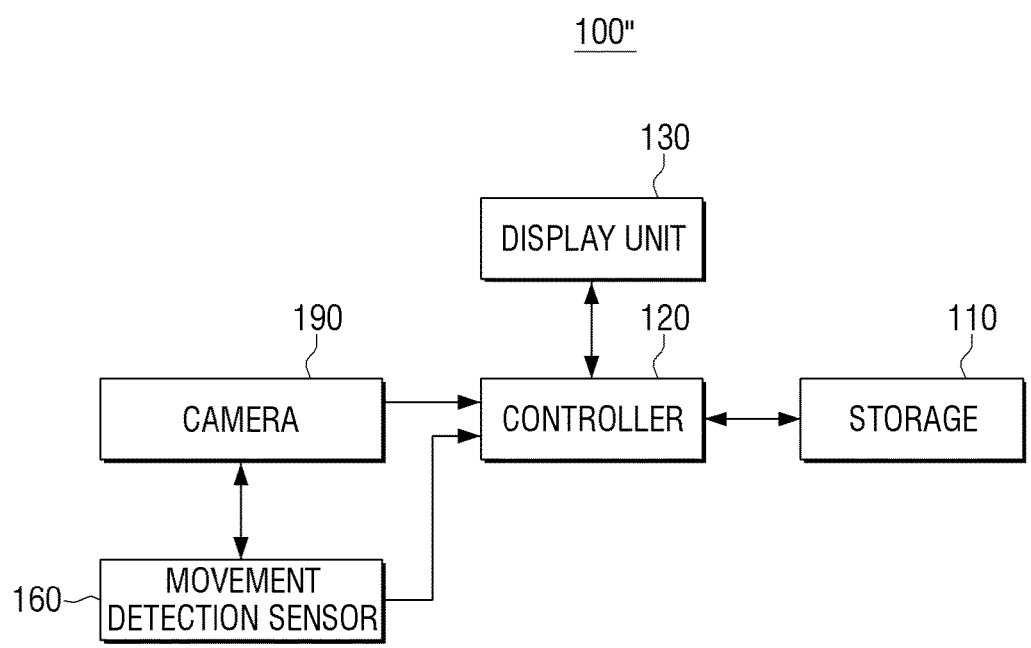
FIG. 7 is a schematic block diagram illustrating a configuration of a video processing apparatus, according to another exemplary embodiment.

FIG. 7 is a schematic block diagram illustrating a configuration of a video processing apparatus 100", according to another exemplary embodiment. As shown in FIG. 7, the video processing apparatus 100" according to the present exemplary embodiment includes the storage 110, the controller 120, the display 130, a camera 190, and a movement detection sensor 160. Hereinafter, repeated descriptions related to FIGS. 1 and 5 will be omitted here.

The camera 190 performs a general digital camera function under control of the controller 120 to photograph visible rays input from an external photographing target. The camera 150 may include an imaging unit including a charge-coupled device (CCD), and so on, and include an illuminance sensor for illuminance measurement, a distance sensor for measurement of a focal distance with a subject, and so on. The controller 120 may process image data output from the camera 150 to convert the data to an appropriate format of digital image data. Accordingly, the video processing apparatus 100" may generate a panoramic video from a video captured by the camera 190 included in the video processing apparatus 100".

The movement detection sensor 160 may be a component for detection of movement of the video processing apparatus 100". While the movement detection sensor 160 detects movement of the video processing apparatus 100", the controller 120 may determine a video section captured by the camera 190 included in the video processing apparatus 100" as a panning section. That is, the video processing apparatus 100" may determine whether the camera 190 of the video processing apparatus 100" is panned from the movement detection sensor 160 included in the video processing apparatus 100" without using a method for extracting a motion vector or a feature point, and extract a panning section in the captured video. The movement detection sensor 160 may include various sensors for measurement of movement or rotation angle of the camera 190 of the video processing apparatus 100", such as an acceleration sensor, a geomagnetic sensor, and so on.

Figure 8:
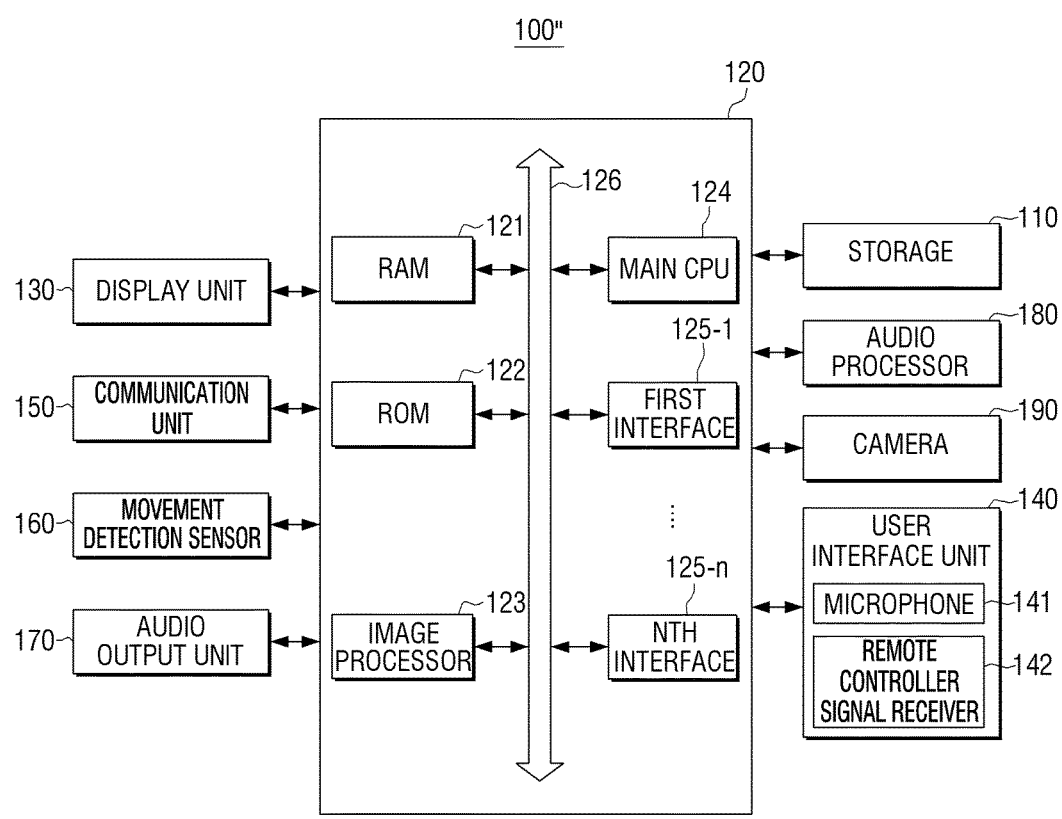
FIG. 8 is a detailed block diagram illustrating a configuration of a video processing apparatus, according to another exemplary embodiment.
Figure 9:
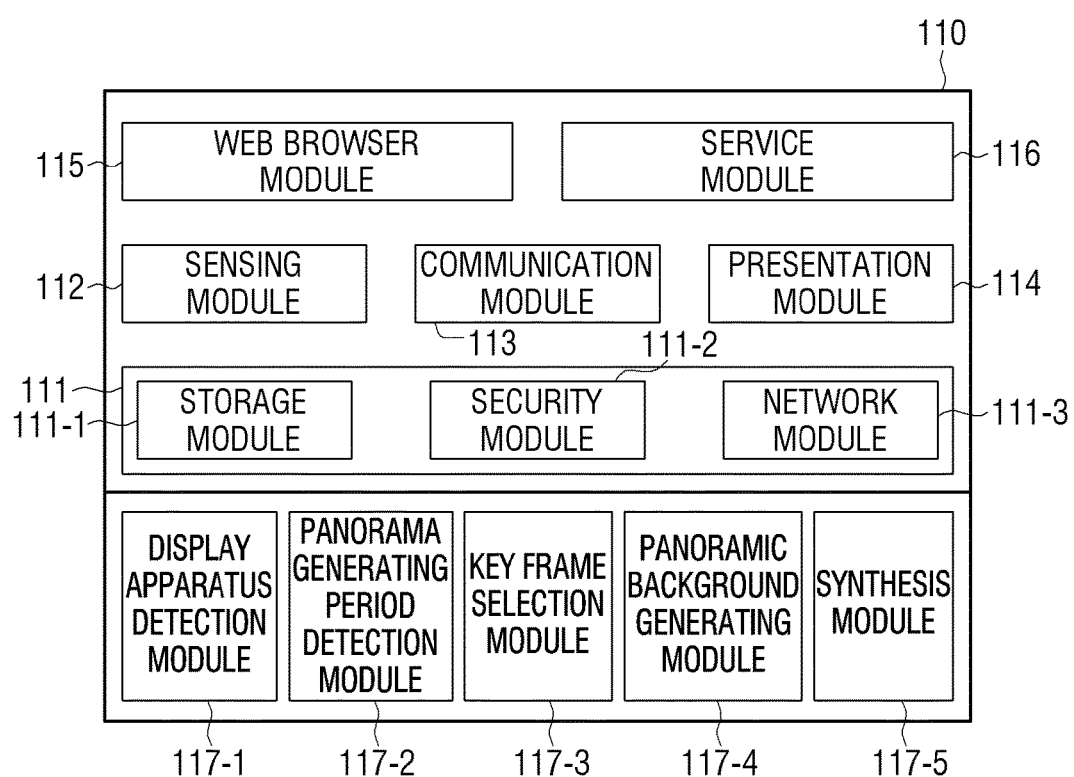
FIG. 9 is a detailed block diagram of a storage, according to an exemplary embodiment.

FIG. 8 is a detailed block diagram illustrating a configuration of a video processing apparatus, according to another exemplary embodiment. As shown in FIG. 9, a voice recognition apparatus 100" according to the present exemplary embodiment includes a storage 110, a controller 120, a display 130, a user interface 140, a communication unit 150, a movement detection sensor 160, an audio output unit 170, an audio processor 180, and a camera 190. Hereinafter, repeated descriptions related to FIG. 7 will be omitted here.

The storage 110 stores various modules for driving the video processing apparatus 100" as well as a captured video and a panoramic video generated by processing the video. In particular, a configuration of the storage 110 will be described below with reference to FIG. 9.

FIG. 9 is a detailed block diagram of the storage 110, according to an exemplary embodiment.

Referring to FIG. 9, the storage 110 may store software including a base module 111, a sensing module 112, a communication module 113, a presentation module 114, a web browser module 115, a service module 116, and a panorama generating module 117.

The base module 111 refers to a base module that processes signals transmitted from hardware included in the video processing apparatus 100" and transmits the signals to a higher layer module. A storage module 111-1 is a program module for managing a database (DB) or a registry. A security module 111-2 is a program module for supporting certification with respect to hardware, request permission, secure storage, and so on, and a network module 111-3 is a module for supporting network access.

The sensing module 112 is a module that collects information from various sensors, and analyzes and manages the collected information.

The communication module 113 is a module for communication with an external device. The communication module 113 may include a messaging module and a telephone module.

The presentation module 114 is a module for configuring a display image. The presentation module 114 includes a multimedia module for reproducing and outputting multimedia content and a user interface (UI) rendering module for performing UI and graphic processing.

The web browser module 115 is a module that performs web browsing to access a web server.

The service module 116 is a module including various applications for providing various services. In detail, the service module 116 may include various program modules such as a social network service (SNS) program, content reproduction program, and so on.

The panorama generating module 117 may include various modules for generating a panoramic video and may include a display apparatus detection module 117-1, a panorama generating section detection module 117-2, a key frame selection module 117-3, a panoramic background generating module 117-4, and a synthesis module 117-5.

The display apparatus detection module 117-1 may detect EDID information about a display apparatus to recognize the number and resolution of connected display apparatuses and determine a maximum aspect ratio of a panoramic video.

The panorama generating section detection module 117-2 may analyze a direction of camera movement, a direction and size of variance of a motion vector, a direction of object tracking, and so on to generate a frame section, such as a panning section, in which a panoramic video is a capable of being generated.

The key frame selection module 117-3 may determine the minimum number of required key frames in consideration of the number and maximum resolution of devices and select key frames using a direction of camera movement, a direction and size of variance of motion vector, a direction of object tracking, FPS information about a video, camera pose information, and so on.

A panoramic background generating module 117-4 may separate background images from one or more target objects of the selected key frames, and stitch the background images to generate a panoramic background image.

The synthesis module 117-5 may synthesize the generated panoramic background image and images of the target objects to generate a panoramic image constituting a panoramic video.

Referring back to FIG. 8, the controller 120 controls an overall operation of the video processing apparatus 100" using the various modules stored in the storage 110.

As illustrated in FIG. 8, the controller 120 includes a random access memory (RAM) 121, a read-only memory (ROM) 122, an image processor 123, a main central processing unit (CPU) 124, first to $n^{th}$ interfaces 125-1 to 125-n, and a bus 126. In this case, the RAM 121, the ROM 122, the image processor 123, the main CPU 124, the first to $n^{th}$ interfaces 125-1 to 125-n, and so on may be connected to one another through the bus 126.

The ROM 122 stores a command set and so on for system booting. The main CPU 124 copies various application programs stored in the storage 110 to the RAM 121 and execute the application programs coped in the RAM 121 to perform various operations.

The image processor 123 is a component for performing image processing on a captured video. The image processor 123 may perform various image processing operations such as decoding, scaling, noise filtering, frame rate conversion, resolution conversion, and the like on the captured video. In particular, the image processor 123 may synthesize frames of the captured video to acquire panoramic images, combine the acquired panoramic images along the time axis to constitute a panoramic video, and then compress the video to manufacture a panoramic image file.

The main CPU 124 accesses the storage 110 and performs booting using an operating system (O/S) stored in the storage 110. In addition, the main CPU 124 performs various operations using various programs, content, data, and so on stored in the storage 110.

The first to $n^{th}$ interfaces 125-1 to 125-n are connected to the aforementioned components. One of the interfaces may be a network interface connected to an external device through a network.

The user interface 140 is a component for detection user interaction for controlling an overall operation of the video processing apparatus 100". In particular, as shown in FIG. 8, the user interface 140 may include various interaction detection devices such as a microphone 141, a remote controller signal receiver 142, and so on.

The communication unit 150 is a component for communication with various types of external devices or an external service according to various types of communication methods. The communication unit 150 may include various communication chips such as a WiFi chip, a Bluetooth chip, a near field communication (NFC) chip, a wireless communication chip, and so on. In this case, a WiFi chip, a Bluetooth chip, and an NFC chip perform communication using a WiFi method, a Bluetooth method, and an NFC method, respectively. Among these, an NFC chip is a chip that operates using an NFC method using a band of 13.56 MHz among various RF-ID frequencies such as 135 kHz, 13.56 MHz, 433 MHz, 860 to 960 MHz, and 2.45 GHz. When a WiFi chip or a Bluetooth chip is used, various pieces of connection information such as a service set identifier (SSID) and a session key may be first transmitted and received to connect communication using the connection information and then various pieces of information may be transmitted and received. A wireless communication chip refers a chip that performs communication according to various communication standards such as IEEE, ZigBee, $3^{rd}$ generation (3G), $3^{rd}$ generation partnership project (3GPP), long term evolution (LTE), and so on. The communication unit 150 may communicate with an external server to receive photograph information (camera pose information and so on) of a video captured by an external camera and generate a panoramic video according to the received information.

The audio output unit 170 is a component for outputting various alarm sounds or voice messages as well as various audio data processed by the audio processor 180. In particular, the audio output unit 170 may be embodied as a speaker, which is merely exemplary, and may be embodied as a different audio output unit such as an audio output terminal.

The audio processor 180 is a component for processing audio data. The audio processor 180 may perform various processing operations such as decoding, amplification, noise filtering, and the like on audio data.

That is, the video processing apparatus 100" may be embodied as one user terminal apparatus including all of the storage 110, the controller 120, the display 130, the user interface 140, the communication unit 150, the movement detection sensor 160, the audio output unit 170, the audio processor 180, and the camera 190, as described above.

Figure 10:
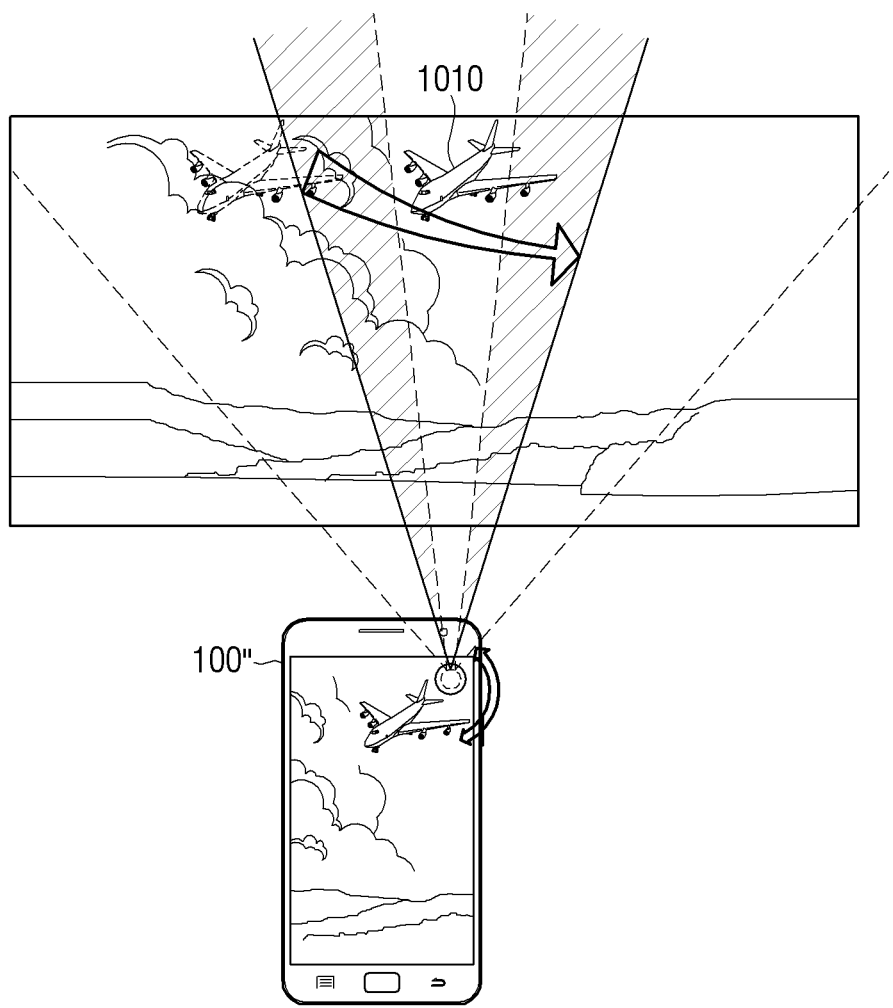
FIGS. 10 and 11 are diagrams for explanation of a method for generating a panoramic image using a panning period, according to exemplary embodiments.
Figure 11:
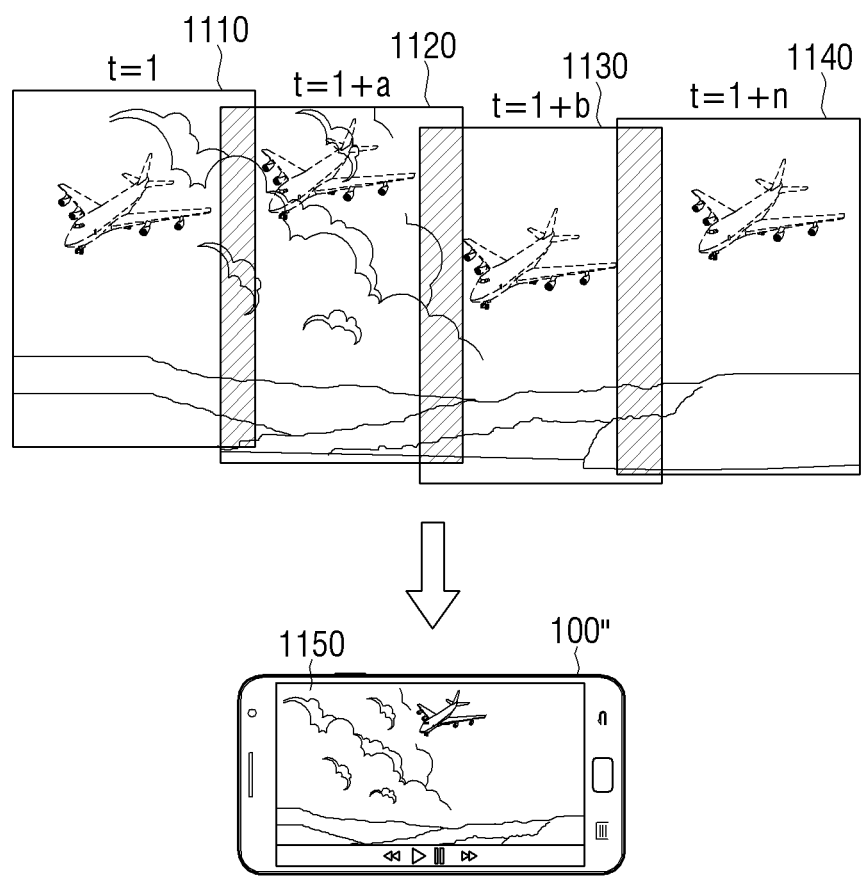

FIGS. 10 and 11 are diagrams for explanation of a method for generating a panoramic image using a panning section, according to exemplary embodiments.

Hereinafter, FIGS. 10 and 11 illustrate an example in which the video processing apparatus 100" is embodied as a portable terminal apparatus.

FIG. 10 illustrates that an airplane 1010 flying from left to right is photographed using the camera 190 included in the video processing apparatus 100". As illustrated in FIG. 10, in this case, only a background image in a horizontally narrow range may be photographed due to the property of the portable terminal apparatus. A user may pan a camera from left to right to capture an image of the airplane 1010 in order to prevent the airplane 1010 from getting out a screen. In this case, the movement detection sensor 160 may sense movement of the video processing apparatus 100" to detect the panning section.

FIG. 11 illustrates a plurality of key frames 1110, 1120, 1130 and 1140 selected in the detected panning section. The plurality of key frames 1110, 1120, 1130 and 1140 may be selected as frames having background image that overlap with one another in the panning section, and a panoramic video may be generated by performing an image processing process on the key frames 1110, 1120, 1130 and 1140.

In detail, the controller 120 may separate a target object of the selected plurality of key frames 1110, 1120, 1130 and 1140 from the background images. Here, the target object may be a moving object having a preset variance or more, which is the airplane 1010. The controller 120 may extract a feature point of the background images from which the target object is separate and match the extracted feature points. Then the controller 120 may stitch and blend the plurality of background images using the matched feature point data and process an empty region from which the target object is removed using a hole filling scheme to generate a panoramic background image 1150. Accordingly, when the video processing apparatus 100" is rotated to a horizontal screen, a waste space in the screen generated by reducing a size of the captured video may be filled in by an additional region acquired by panning the video processing apparatus 100".

Figure 12:
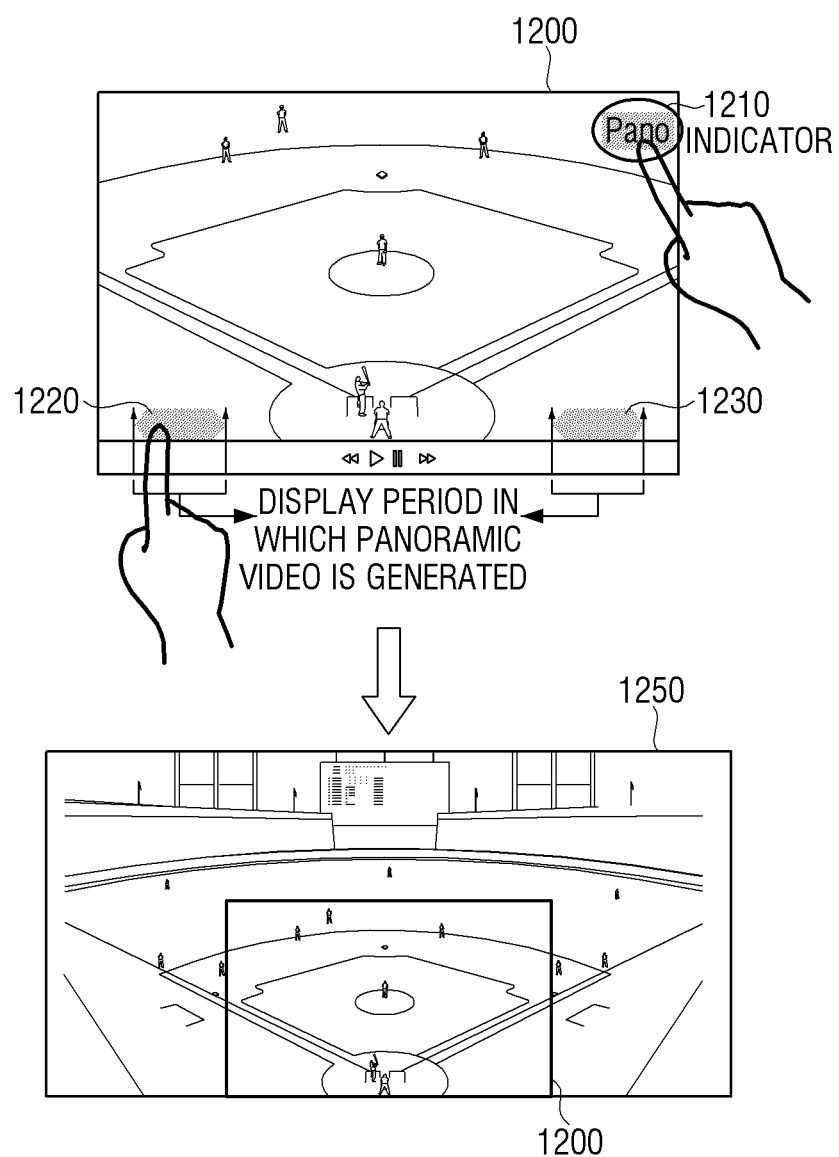
FIG. 12 is a diagram for explanation of a method for displaying a panoramic video, according to an exemplary embodiment.

FIG. 12 is a diagram for explanation of a method for displaying a panoramic video, according to an exemplary embodiment.

As illustrated in FIG. 12, when the aforementioned processing is performed on a captured video to generate a panoramic video section, an indicator 1210 for displaying a panoramic video may be displayed during reproduction of the video. In this case, a user may touch the displayed indicator or select the indicator via manipulation of a remote controller to command reproduction of the panoramic video. In response to the command being input, when the panoramic video is reproduced or is generated during a portion of an entire reproduction section, the controller 120 may display a section (a panoramic video section) in which the panoramic video is generated, on a control bar or the like on a lower end of a screen. Thus, when a reproduction frame reaches a panoramic video section or the user selects the corresponding section through an interface such as a touch pane, a remote controller, and so on, a panoramic video 1250 is displayed.

The indicator may be displayed to overlap with a video and may be changed in a size, shape, position, color, and so on according to a property of the panoramic video while being displayed. For example, the shape of the indicator may be displayed with the same ratio as an aspect ratio of the panoramic video.

The shape of the indicator may not be limited to the aforementioned embodiment and may be displayed in various methods. For example, the indicator may be displayed in the form of text or icon on an image list of a reproduction list.

Information about whether the panoramic video has been generated and a panoramic video section may be stored as metadata information in a video file.

Figure 13:
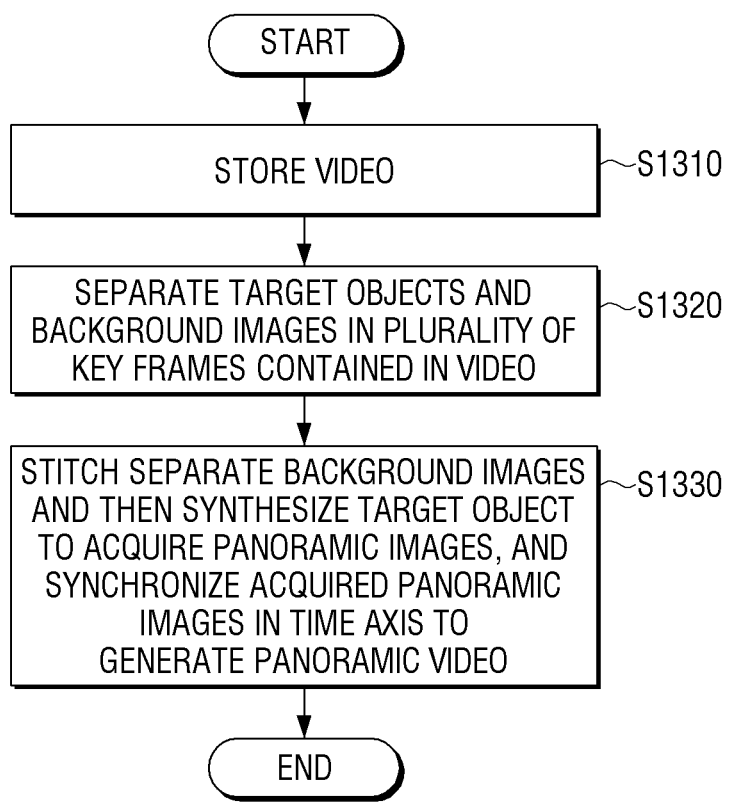
FIG. 13 is a flowchart for explanation of a method for generating a panoramic video, according to an exemplary embodiment.

FIG. 13 is a flowchart for explanation of a method for generating a panoramic video, according to an exemplary embodiment.

First, a video captured by a camera is stored (S1310). In this case, the video may correspond to a video captured by one camera or a plurality of videos captured by a plurality of cameras at different angles. Then a target object and background images in a plurality of key frames contained in the video are separated from one another (S1320). Here, a frame with a high variance among a series of frames in the video may be detected as a key frame. The key frame may also be detected using FPS information about a video, camera pose information, or the like. Then, the separated background images are stitched, and then, the target object is synthesized to acquire panoramic images, and the acquired panoramic images are combined in the time axis to generate a panoramic video (S1330). In detail, the panoramic video may be generated by extracting feature points of background images from which the target object is separated and matching the extracted feature points, stitching a plurality of background images using the matched feature point data, blending the stitched background images, and performing hole filling processing on the blended background images.

FIG. 14 is a flowchart for explanation of a method for generating a panoramic video, according to another exemplary embodiment.

First, a video is captured by a camera included in a video processing apparatus (S1410), and movement of the video processing apparatus that is capturing an image is detected (S1420). In this case, a video section photographed while movement is detected by a camera included in the video processing apparatus may be determined as a panning section. Next, the video captured by the camera is stored (S1430), and a plurality of key frames are selected from frames in a section of a video captured while movement of the video processing apparatus is detected in all frames included in the video (S1440). Target objects and background images in a plurality of key frames included in the video are separated from one another (S1450). The separated background images are stitched, and then, the target objects are synthesized to acquire panoramic images. The acquired panoramic images are combined in the time axis to generate a panoramic video (S1460).

A method for controlling the video processing apparatus according to the aforementioned various embodiments may be embodied as a program, and may be provided to a video processing apparatus.

According to exemplary embodiments, the term video processing apparatus is used in that the apparatus processes a video to generate a panoramic video, but may also be referred to as a panoramic video generating apparatus, a panoramic image generating apparatus, a panoramic image processing apparatus, and so on.

According to an exemplary embodiment, there is provided a non-transitory computer readable medium for temporally storing a program for execution of the above described process or method.

The non-transitory computer readable media refers to a medium that semi-permanently stores data and is readable by a device instead of a medium that stores data for a short time section, such as a register, a cache, a memory, etc. In detail, the aforementioned programs may be stored and provided in the non-transitory computer readable media such as compact disc (CD), digital versatile disc (DVD), hard disc, blue ray disc, universal serial bus (USB_, a memory card, ROM, etc.

The foregoing exemplary embodiments and advantages are merely exemplary and are not to be construed as limiting the inventive concept. Also, the description of the exemplary embodiments is intended to be illustrative, and not to limit the scope of the inventive concept, and many alternatives, modifications, and variations will be apparent to those skilled in the art.

What is claimed is:

1. A video processing apparatus comprising:
  a storage configured to store a video captured by a camera which is being panned; and
  a controller configured to select a plurality of key frames, which are obtained by the camera at different time-points, from a panning section of the video, separate target objects and background images from the plurality of key frames, stitch the separated background images to generate a panoramic background image, synthesize the target objects with the panoramic background image to acquire a plurality of panoramic images corresponding to the plurality of key frames, and combine the panoramic images in a time axis to generate a panoramic video,
  wherein the frames of the panning section comprise frames captured while the camera is being panned, and
  wherein, in the panoramic video, the panoramic background image is not changed over time.

2. The video processing apparatus as claimed in claim 1, further comprising:
  the camera configured to capture the video; and a movement detection sensor configured to detect movement of the camera,
wherein the controller is further configured to determine a video section, corresponding to panning movement of the camera detected by the movement detection sensor, as the panning section.

3. The video processing apparatus as claimed in claim 1, wherein the controller is configured to analyze a property of an object contained in each frame included in the video, and select a plurality of frames having overlapping background images as the key frames.

4. The video processing apparatus as claimed in claim 1, further comprising a display configured to display the video, wherein the controller is further configured to control the display to display the panoramic images at timing of displaying of the plurality of key frames in the video when the video is reproduced.

5. The video processing apparatus as claimed in claim 1, wherein the controller is further configured to generate the plurality of panoramic images in which at least one of a position and a shape of the target object is changed as many times as a number of the key frames in order to express movement of the target objects, replace the key frames with the panoramic images, and store the panoramic images in the storage.

6. The video processing apparatus as claimed in claim 1, wherein the controller is further configured to determine a maximum aspect ratio of the panoramic video based on extended display identification data (EDID) information about a display to reproduce the video, and generate the panoramic video to have the determined maximum aspect ratio.

7. The video processing apparatus as claimed in claim 1, wherein the controller is further configured to adjust the key frames to align background images of the key frames, and generate the panoramic video using each of the adjusted key frames.

8. The video processing apparatus as claimed in claim 4, wherein the controller is further configured to display an indicator indicating that the panoramic images are generated, on the display when the video is reproduced.

9. The video processing apparatus as claimed in claim 8, wherein the controller is further configured to display the indicator to overlap with the video and change at least one of a size, a shape, a position and a color of the indicator according to a property of the panoramic video when the video is reproduced on the display.

10. A method for generating a panoramic video, the method comprising:
storing a video captured by a camera which is being panned;
selecting a plurality of key frames, which are obtained by the camera at different time-points, from a panning section of the video;
separating target objects and background images from the plurality of key frames;
stitching the separated background images to generate a panoramic background image;
synthesizing the target objects with the panoramic background image to acquire a plurality of panoramic images corresponding to the plurality of key frames; and
combining the panoramic images in a time axis to generate a panoramic video,
wherein the frames of the panning section comprise frames captured while the camera is being panned, and
wherein, in the panoramic video, the panoramic background image is not changed over time.

11. The method as claimed in claim 10, further comprising detecting movement of the camera,
wherein the panning section is a video section corresponding to panning movement of the camera detected in the movement of the camera.

12. The method as claimed in claim 10, further comprising analyzing a property of an object contained in each frame included in the video, and selecting a plurality of frames having overlapping background images as the key frames.

13. The method as claimed in claim 10, further comprising displaying the panoramic video comprising the panoramic images at timing of displaying of the key frames in the video when the video is reproduced.

14. The method as claimed in claim 10, further comprising:
generating the panoramic images in which at least one of a position and a shape of the target object is changed as many times as a number of the key frames in order to express movement of the target objects; and
replacing the key frames with the panoramic images and storing the panoramic images.

15. The method as claimed in claim 10, further comprising determining a maximum aspect ratio of the panoramic video based on extended display identification data (EDID) information about a display to reproduce the video.

16. The method as claimed in claim 10, wherein the generating the panoramic video comprises:
adjusting the key frames to align background images of the key frames; and
generating the panoramic video using each of the adjusted key frames.

17. The method as claimed in claim 13, wherein the displaying the panoramic video comprises displaying an indicator indicating that the panoramic video is generated.

18. The method as claimed in claim 17, wherein the displaying the panoramic video comprises:
displaying the indicator to overlap with the video; and
changing at least one of a size, a shape, a position and a color of the indicator according to a property of the panoramic video when the video is reproduced.

19. The method as claimed in claim 10, wherein an aspect ratio of the panoramic video is changed according to setting of a range of a panning section and a selection range of the key frames, and
wherein the panning section comprises a plurality of frames which are captured while the camera is being panned to capture the video.

* * * * *